(12) United States Patent
Osakabe (10) Patent No.: US 11,545,178 B2
(45) Date of Patent: *Jan. 3, 2023

(54) SUBSTRATE FOR MAGNETIC DISK AND MAGNETIC DISK

(71) Applicant: HOYA CORPORATION, Tokyo (JP)

(72) Inventor: Kinobu Osakabe, Tokorozawa (JP)

(73) Assignee: HOYA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/315,145

(22) Filed: May 7, 2021

(65) Prior Publication Data

US 2021/0264943 A1 Aug. 26, 2021

Related U.S. Application Data

(63) Continuation of application No. 16/499,200, filed as application No. PCT/JP2018/014169 on Apr. 2, 2018, now Pat. No. 11,031,036.

(30) Foreign Application Priority Data

Mar. 31, 2017 (JP) .............................. JP2017-070232

(51) Int. Cl.
*G11B 5/73* (2006.01)
*G11B 5/82* (2006.01)

(52) U.S. Cl.
CPC ...... *G11B 5/73917* (2019.05); *G11B 5/73915* (2019.05); *G11B 5/73919* (2019.05); *G11B 5/73921* (2019.05); *G11B 5/82* (2013.01)

(58) Field of Classification Search
None
See application file for complete search history.

(56) References Cited

U.S. PATENT DOCUMENTS 4,882,236 A 11/1989 Smith et al.
5,626,943 A 5/1997 Tenhover
(Continued)

FOREIGN PATENT DOCUMENTS

CN 1934620 A 3/2007
CN 1993735 A 7/2007
(Continued)

OTHER PUBLICATIONS

Office Action translated into Japanese in the corresponding Chinese Patent Application No. 202010854430.5, dated May 7, 2021.
(Continued)

*Primary Examiner* — Kevin M Bernatz
(74) *Attorney, Agent, or Firm* — Global IP Counselors, LLP (57) ABSTRACT

A non magnetic substrate for a magnetic disk includes a substrate main body having two opposing main surfaces and being a glass substrate main body or an aluminum alloy substrate main body, and a metal film made of an Ni—P alloy and provided on the main surfaces and an outer circumferential edge surface of the substrate main body. The non magnetic substrate has a thickness (T+D) of 0.57 mm or less, which is the sum of a thickness T of the substrate main body and a thickness D of the metal film. The non magnetic substrate has a diameter of 90 mm or more. A ratio D/T is 0.025 or more. The outer circumferential edge surface of the substrate main body forming an interface with the metal film has a surface roughness maximum height Rz of 0.5 μm or more.

20 Claims, 2 Drawing Sheets

(Thickness $D = D_1 + D_2$)

(56) References Cited

U.S. PATENT DOCUMENTS

| | | | |
|---|---|---|---|
| 5,747,135 A | 5/1998 | Chakrabarti et al. | |
| 6,316,097 B1 | 11/2001 | Liu et al. | |
| 6,863,947 B2 | 3/2005 | Kaneko | |
| 7,573,674 B1 | 8/2009 | Wittig et al. | |
| 8,167,685 B2 | 5/2012 | Sakaguchi et al. | |
| 10,573,342 B2 | 2/2020 | Murase et al. | |
| 11,031,036 B2 * | 6/2021 | Osakabe | G11B 5/73917 |
| 11,152,026 B2 * | 10/2021 | Osakabe | G11B 5/73917 |
| 11,205,453 B2 | 12/2021 | Takimoto et al. | |
| 2002/0142191 A1 | 10/2002 | Sakai et al. | |
| 2003/0170416 A1 | 9/2003 | Saito et al. | |
| 2007/0048553 A1 | 3/2007 | Nakano et al. | |
| 2008/0085428 A1 | 4/2008 | Aida | |
| 2010/0118432 A1 | 5/2010 | Shibano | |
| 2013/0086986 A1 | 4/2013 | Lanham et al. | |
| 2015/0248910 A1 | 9/2015 | Itaya et al. | |
| 2015/0255103 A1 | 9/2015 | Ueda | |
| 2015/0332722 A1 | 11/2015 | Tamaki | |
| 2016/0005431 A1 | 1/2016 | Tamaki et al. | |
| 2016/0351224 A1 | 12/2016 | Kitawaki et al. | |
| 2018/0226095 A1 | 8/2018 | Murase et al. | |
| 2019/0333535 A1 | 10/2019 | Takimoto et al. | |
| 2020/0027481 A1 | 1/2020 | Osakabe | |
| 2021/0407544 A1 * | 12/2021 | Osakabe | G11B 5/73911 |

FOREIGN PATENT DOCUMENTS

| | | |
|---|---|---|
| CN | 101002255 A | 7/2007 |
| CN | 104584125 A | 4/2015 |
| CN | 104584126 A | 4/2015 |
| CN | 104823239 A | 8/2015 |
| CN | 105009213 A | 10/2015 |
| CN | 105009213 B | 6/2018 |
| JP | H07-57233 A | 3/1995 |
| JP | H09-198640 A | 7/1997 |
| JP | 2005-322364 A | 11/2005 |
| JP | 2005-346880 A | 12/2005 |
| JP | 2006-085887 A | 3/2006 |
| JP | 2006-260700 A | 9/2006 |
| JP | 2006-302358 A | 11/2006 |
| JP | 2009-160831 A | 7/2009 |
| JP | 2010-118111 A | 5/2010 |
| JP | 2016-126808 A | 7/2016 |
| JP | 2017-199442 A | 11/2017 |
| JP | 2018125056 A | 8/2018 |
| WO | 2016108286 A1 | 7/2016 |
| WO | 2018124262 A1 | 7/2018 |

OTHER PUBLICATIONS

International Search Report in PCT/JP2018/014169 dated Jul. 3, 2018.

Notice of Decision translated into English in the corresponding Chinese Patent Application No. 201880013884.0, dated Jun. 10, 2020.

* cited by examiner

(Thickness D=D₁+D₂)

FIG. 3

SUBSTRATE FOR MAGNETIC DISK AND MAGNETIC DISK

CROSS-REFERENCE TO RELATED APPLICATIONS

This is a continuation application of U.S. patent application Ser. No. 16/499,200, filed on Sep. 27, 2019, now U.S. Pat. No. 11,031,036, which is a U.S. National stage application of International Patent Application No. PCT/JP2018/014169, filed on Apr. 2, 2018, which, in turn, claims priority to Japanese Patent Application No. 2017-070232, filed in Japan on Mar. 31, 2017. The entire contents of U.S. patent application Ser. No. 16/499,200, International Patent Application No. PCT/JP2018/014169 and Japanese Patent Application No. 2017-070232 are hereby incorporated herein by reference.

BACKGROUND

Field of the Invention

The present invention relates to a non magnetic substrate for a magnetic disk, and a magnetic disk.

Background Information

Conventionally, glass substrates and aluminum alloy substrates have been used as magnetic disk substrates. Magnetic-disk substrates are formed by forming a magnetic film on main surfaces of these substrates. There is a demand for magnetic disks that does not have surface defects and in which reading and writing of information is not hindered, and reading and writing of a large amount of information is enabled.

For example, in a case where an aluminum alloy substrate is used as a non magnetic substrate for a magnetic disk, a surface of the aluminum alloy substrate is plated with NiP. In order to keep defects from occurring on the plated surface, an aluminum alloy substrate for a magnetic recording medium (may be abbreviated as an "AL alloy substrate" or an "Al—Mg alloy substrate" hereinafter) provided with a metal coating through physical vapor deposition on surfaces of the substrate is known (JP 2006-802858A).

With the above described Al alloy substrate for a magnetic recording medium, it is possible to reduce surface defects formed on the surface of this substrate plated with NiP. Accordingly, a magnetic disk in which reading and writing of information is not hindered, and reading and writing of a large amount of information is enabled can b provided.

However, in recent years, in the hard disk drive industry, miniaturization of magnetic particles in magnetic disks is approaching the limit, and the speed at which recording density was improved in the past shows signs of slowing down. On the other hand, in order to analyze big data, there is increasing demand for an increase in the storage capacity of hard disk drive apparatuses (may be abbreviated as HDDs hereinafter). Thus, attempts have been made to increase the number of magnetic disks provided in one hard disk drive apparatus.

If an increase in the storage capacity is to be realized by increasing the number of magnetic disks incorporated in a hard disk drive apparatus, there is a need to reduce the thickness of a magnetic disk substrate occupying the majority of the thickness of the magnetic disk in a limited space in the magnetic disk drive apparatus.

Here, it has been found that, if the thickness of the magnetic disk substrate is reduced, the rigidity of the substrate decreases, large vibration is likely to occur, and vibration is unlikely to settle in some cases. For example, an incredibly large number of hard disk drive apparatuses are used in a data center for a cloud, and thus hard disk drive apparatuses are often replaced due to failures. It was found that a new hard disk drive apparatus failed by an impact occurring when the new hard disk drive apparatus is mounted on a rack, or the period of time until it fails is shortened. Also, more thorough studies found that, when a hard disk drive apparatus takes on an external impact, the hard disk drive apparatus is damaged even though the magnetic disk is not rotating due to no power being supplied to the hard disk drive apparatus.

Unlike steady-state flutter vibration caused by the rotating magnetic disk and the air flow around the magnetic disk in a steady rotational state, vibration caused by an external impact in this manner attenuates over time. However, if this vibration has a large amplitude, particles are formed due to the magnetic head coming into contact with a ramp provided to extend over a main surface of the magnetic disk so as to retract from the magnetic disk, and a ramp member being chipped, for example, and scratches and defects occur on surfaces of the magnetic disk in some cases. Also, if vibration does not converge, the above-described number of instances of contact increases, and scratches, defects, and particles are more likely to occur on surfaces of the magnetic disk. In present circumstances, the magnetic-disk substrate is thick, and thus is unlikely to have an amplitude of vibration caused by an external impact that is problematic. Also, because the number of magnetic disks provided in a hard disk drive apparatus is small, the distance (gap) between the magnetic disk and the ramp is relatively large. Thus, the magnetic disk and the ramp are unlikely to come into contact with each other. However, in the future, if the thickness of a magnetic-disk substrate is reduced to 0.700 mm or less in order to increase the storage capacity of a hard disk drive apparatus, for example, vibration caused by an external impact that has conventionally not boon an issue, contact with another member accompanying vibration, and particles, scratches, recesses, and the like that are formed accompanying contact with the ramp cannot be ignored.

SUMMARY

In view of this, an object of the present invention is to provide a non-magnetic substrate for a magnetic disk and a magnetic disk by which vibration of the magnetic disk that is caused by an impact received from the outside and is different from flutter vibration can be effectively reduced even if the thickness of the substrate is reduced.

One aspect of this disclosure is a non magnetic substrate for a magnetic disk. The non magnetic substrate includes a substrate main body that has two opposing main surfaces and is a glass substrate main body or an aluminum alloy substrate main body; and a metal film that is provided on the main surfaces of the substrate main body and an outer circumferential edge surface of the substrate main body, and is made of an Ni—P alloy. The non-magnetic substrate has a thickness (T+D) of 0.57 mm or less, the thickness (T+D) being the sum of a thickness T of the substrate main body and a thickness D of the metal film. The non magnetic substrate has a diameter of 90 mm or more. A ratio D/T of the thickness D of the metal film to the thickness T of the substrate main body is 0.025 or more. The outer circumferential edge surface of the substrate main body forming an interface with the metal film has a surface roughness maximum height Rz of 0.5 μm or more.

The surface roughness maximum height Rz of the outer circumferential edge surface of the substrate main body is greater than a surface roughness maximum height Rz of the metal film formed on the outer circumferential edge surface of the substrate main body The thickness of the metal film formed on each of the main surfaces of the substrate main body is less than the thickness of the metal film formed on the outer circumferential edge surface of the substrate main body, and is 80% or more of the thickness of the metal film formed on the outer circumferential edge surface of the substrate main body.

The ratio D/T of the thickness D of the metal film to the thickness T of the substrate main body is 0.03 or more.

Another aspect of this disclosure is a magnetic disk in which a surface of the non-magnetic substrate for a magnetic disk has at least, a magnetic film.

According to another aspect of this disclosure, a hard disk drive comprises the magnetic disk; and a magnetic head.

DESCRIPTION OF EMBODIMENTS

Hereinafter, a non-magnetic substrate for a magnetic disk of the present invention will be described in detail. Note that although the following description will be given below using a magnetic-disk glass substrate, a substrate main body of the non magnetic substrate for a magnetic disk may be a non magnetic metal substrate, in addition to a glass substrate.

Aluminosilicate glass, soda-lime glass, borosilicate glass, and the like can be used as a material of the glass substrate. In particular, amorphous aluminosilicate glass can be suitably used in that chemical strengthening can be performed as needed, and a magnetic disk glass substrate that has excellent flatness of main surfaces and substrate strength can be produced.

For example, an aluminum alloy, a titanium alloy, Si single crystal, and the like can be used as a material of a substrate made of metal. If an aluminum alloy is used, an Al—Mg (aluminum magnesium based) alloy containing magnesium as a component can be used. In particular, out of these materials, an aluminum alloy can be suitably used.

Figure 1:
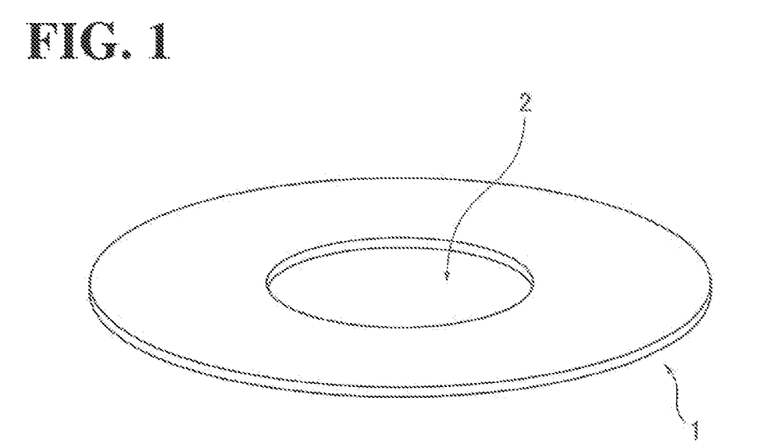
FIG. 1 is a diagram showing one example of an external shape of a non-magnetic substrate for a magnetic disk according to this embodiment.

FIG. 1 is a diagram showing an external shape of a non-magnetic substrate for a magnetic disk according to this embodiment. As shown in FIG. 1, a non-magnetic substrate 1 for a magnetic disk according to this embodiment (simply referred to as a "non magnetic substrate 1" hereinafter) is a disk shaped thin substrate provided with an inner hole 2. Although there is no limitation on the size of the non magnetic substrate 1, the non-magnetic substrate 1 can be suitably applied to a magnetic disk substrate having a nominal diameter of 2.5 inches, or 3.5 inches, for example, in the case of a magnetic disk substrate having a nominal diameter of 3.5 inches, the disk shape preferably has an outer diameter (diameter) of 90 mm or more. Specifically, the nominal value of the outer diameter of the disk shape can be set to 95 mm or 97 mm. Even if a magnetic-disk substrate has such a large disk shape, the occurrence of particles, scratches, and recesses caused by vibration of a magnetic disk can be reduced by forming a film, which will be described later, on the main surfaces. Note that vibration of a magnetic disk caused by an external impact that is different from flutter vibration increases as the outer diameter of the non-magnetic substrate 1 increases, and is less likely to attenuate. Thus, the non-magnetic substrate 1 according to this embodiment is preferably used in a magnetic disk made to a 3.5-inch nominal diameter standard or better.

Figure 2:
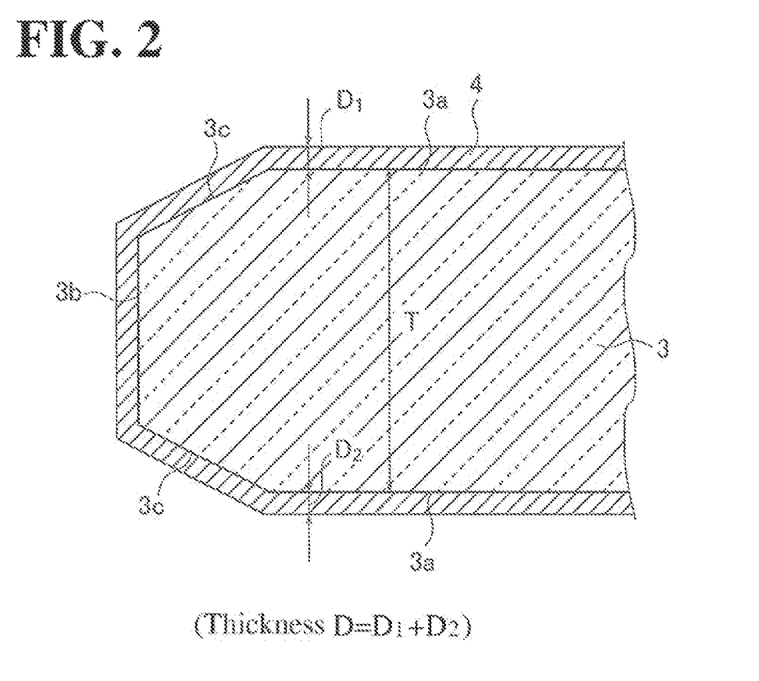
FIG. 2 is a diagram showing one example of an edge portion of the non magnetic substrate for a magnetic disk and a film according to this embodiment.

FIG. 2 is a diagram illustrating one example of an edge portion of the nonmagnetic substrate 1 and a film. As shown in FIG. 2, the non-magnetic substrate 1 includes a substrate main body 3 and a film 4.

The substrate main body 3 includes a pair of main surfaces 3a, a side wall surface 3b disposed in a direction orthogonal to the pair of main surfaces 3a, and a pair of chamfered surfaces 3c disposed between the pair of main surfaces 3a and the side wall surface 3b. The side wall surface 3b and the chamfered surfaces 3c are formed at an edge portion of the non-magnetic substrate 1 on the outer circumferential side and an edge portion thereof on the inner circumferential side.

If glass is used in the substrate main body 3, for example, the glass composition of the substrate main body 3 may include $SiO_2$ in an amount of 55 to 78 mol %. $Li_2O$ in an amount of 0.1 to 1 mol %. $Na_2O$ in an amount of 2 to 15 mol %, and MgO, CaO, SrO, and BaO in a total amount of 10 to 25 mol %, and a molar ratio (CaO/(MgO+CaO+SrO+BaO)) of the content of CaO to the total content of MgO, CaO, SrO, and BaO may be 0.20 or less (referred to as glass 1 hereinafter).

Also, glass of the substrate main body 3 may be amorphous oxide glass containing $SiO_2$ in an amount of 45 to 08 mol %. $Al_2O_3$ in an amount of 5 to 20 mol %, $S_1O_2$ and $Al_2O_3$ in a total amount ($SiO_2+Al_2O_3$) of 60 to 80 mol %. $B_2O_3$ in an amount of 0 to 5 mol %. MgO in an amount of 3 to 28 mol %. CaO in an amount of 0 to 18 mol %. BaO and SrO in a total amount (BaO+SrO) of 0 to 2 mol %, alkaline earth metal oxides in a total amount (MgO+CaO+SrO+BaO) of 12 to 30 mol %, alkali metal oxides in a total amount ($Lb_2O+Na_2O+K_2O$) of 3.5 to 15 mol %, and at least one selected from the group consisting of Sn oxides and Ce oxides in a total amount of 0.05 to 2.00 mol % (this glass is referred to as glass 2 hereinafter).

As shown in FIG. 2, the main surfaces 3a, the side wall surface 3b, and the chamfered surfaces 3c of the substrate main body 3 are provided with a film 4. The film 4 improves vibration isolation properties of the non-magnetic substrate 1.

The film 4 is a metal film made of a metal material having a loss factor of 0.01 or more. The metal material of the film 4 is a material whose loss factor is higher than that of the material of the substrate main body 3. The value of a loss factor is the value at room temperature, for example, at 25° C. Hereinafter, a loss factor is the value at room temperature.

Here, the loss factor of the film 4 is obtained through a vibration test in which the substrate main body 3 and the non magnetic substrate 1 obtained by forming the film 4 on the substrate main body 3 are used as test samples, and the resonance frequencies and half widths at the resonance frequencies of the test samples are obtained. In the vibration test. "Young's modulus, shear modulus, and internal friction measuring device using free resonance method (JE series)"

manufactured by Nihon Techno-Plus Co., Ltd. can lie used, for example. The loss factors of the test samples are obtained from resonance frequencies and half widths of the test samples obtained in the vibration test. Also, the loss factor of the film 4 can be calculated according to a known equation indicated below, for example, from the resonance frequency and the loss factor of the non magnetic substrate 1, the resonance frequency of the substrate main body 3, a ratio between the thickness of the substrate main body 3 and the thickness of the film 4, and a ratio between the density of the material of the substrate main body 3 and the density of the metal material of the film 4.

When the resonance frequency and the loss factor of the non-magnetic substrate 1 are respectively $f_1$ and $\eta_1$ the resonance frequency of the substrate main body 3 is $f_3$, a ratio of the total thickness of the film 4 to the thickness of the substrate main body 3 is a, and a ratio of the density of the metal material of the film 1 to the density of the material of the substrate main body 3 is b, the loss factor $\eta_4$ of the film 4 can be expressed as $\eta_4 = \alpha/(\alpha-1) \cdot \eta_1$ where $\alpha = (f_1/f_3)^2 \cdot (1+a \cdot b)$.

An Ni—P alloy containing Ni and P can be used as a material having such a property (loss factor) of the film 4. If an Ni—P alloy is used, it is sufficient to add P to an alloy to make the alloy non-magnetic. For example, the content of P can lie set to be 5 to 15 mass %. Also, an Mg alloy, an Al—Zn alloy, an Mg—Zr alloy, and the like can be used. Note that a sputtering method, an electroless plating method, an electrolytic plating method, or the like can be used as a film formation method. A film formation method need only be selected from these methods as appropriate.

When the thickness of the substrate main body 3 is a thickness T anil the thickness of the film 4 is a thickness D, a thickness (T+D) of the non-magnetic substrate 1 including the substrate main body 3 and the film 4 is 0.700 mm or less. A ratio D/T of the thickness D) (=D1+D2) of the film 4 provided on a main surface 3*a* to the thickness T of the substrate main body 3 is 0.05 or more. Note that it is preferable that the thickness of the film 4 does not change depending on a position on a main surface, and is constant on the main surfaces.

Although the non magnetic substrate 1 is likely to vibrate due to an external impact or the like because such a non magnetic substrate 1 has a thickness of 0.700 mm or less, even if the above-described vibration occurs, the film 1 is formed on the main surface 3*a* of the substrate main body 3, and thus it is possible to attenuate the vibration. Also, it is preferable that the film 4 seamlessly covers the entire metal main body 1 including edge surfaces thereof because the degree of suppression of the vibration in particular increases. Also, in this case, it is more preferable that the film 4 is harder than the substrate main body 3. Also, it is even more preferable that D1 and D2 are equal to each other. In such a case, a vibration mode in which local deformation occurs is less likely to occur, and the degree of suppression of vibration is higher. Thus, it is possible to reduce the number of instances of contact with a ramp, a disk located adjacent thereto, the possibility of contact therewith, and an impact occurring in ion tact therewith.

Note that although the films A are respectively formed on the main surfaces 3*a* on both sides in Ibis embodiment, this embodiment also includes a configuration in which the film 4 is formed only on one of the main surfaces 3*a*. In this case, the thickness D of the film 4 is the thickness of the film 4 formed on the one main surface 3*a*.

Figure 3:
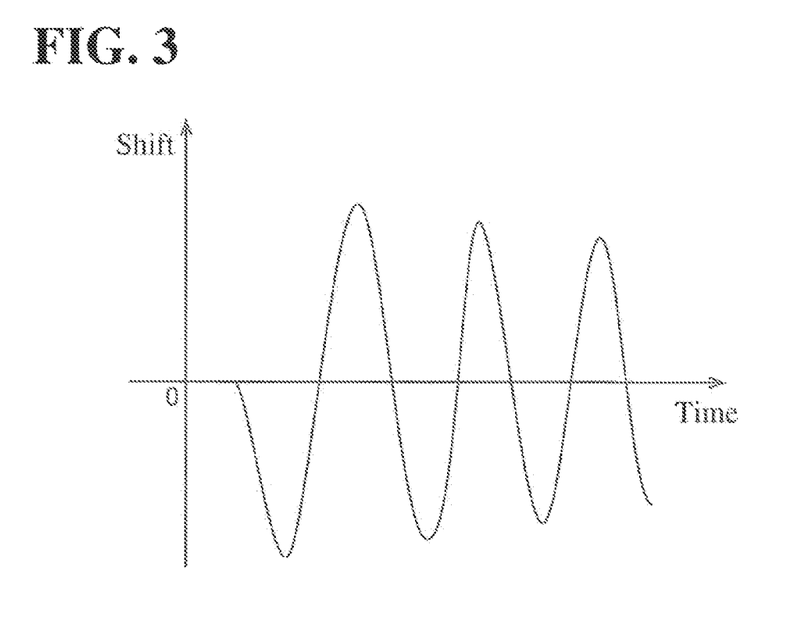
FIG. 3 is a diagram showing one example of vibration of the non-magnetic substrate for a magnetic disk according to this embodiment.

A magnetic disk produced by forming a magnetic film on the non-magnetic substrate 1 is fixed to a spindle of a hard disk drive apparatus, in the inner hole 2 in the hard disk drive apparatus. For example, when a new hard disk drive apparatus is mounted on a rack for replacement a hard disk drive apparatus on a rack is detached therefrom in order to move the hard disk drive apparatus to another position, for example, the hard disk drive apparatus may lie subjected to an external impact accompanying these operations. With the non magnetic substrate 1 to which the inner hole 2 is fixed by the spindle, due to such an impact, vibration by which the main surfaces 3*a* around the inner hole 2 shift in the normal direction (the thickness direction of the non-magnetic substrate 1) of the main surfaces 3*a* occurs. Unlike steady-state flutter vibration caused by the rotating magnetic disk and the air flow around the magnetic disk in a steady rotational state, as shown in FIG. 3, this vibration is vibration that attenuates over time. FIG. 3 is a diagram illustrating one example of vibration of the non-magnetic substrate 1.

Such vibration occurs even when the magnetic disk is rotating or is static, it is not preferable that this vibration continues for a long time, the magnetic disk formed from the non magnetic substrate 1 repeatedly comes into contact with the ramp in the hard disk drive apparatus, and scratches and defects occur on a surface of the magnetic disk, and particles are formed as a result of the ramp member being chipped due to this contact therewith.

However, in the non magnetic substrate 1, a film is constituted by a material having a loss factor of 0.01 or more, and the ratio D/T of the thickness D (=D1+D2) of the film 1 to the thickness T of the substrate main body 3 is 0.025 or more, and thus it is possible to attenuate the vibration early. It is preferable that the film 4 has a loss factor of 0.02 or more. On the other hand, although there is no particular limitation on the upper limit of the loss factor of the film 4, a material having an excessively large loss factor may be a soft material whose crystal are likely to break. Thus, from the viewpoint that a practical metal material can be used, a material having a loss factor of 0.3 or less is preferable.

If the ratio D/T is less than 0.025, the thickness D of the film 4 is not sufficiently thick relative to the thickness T of the substrate main body 3, and thus it is difficult to attenuate vibration in the non magnetic substrate 1 early, and the film 4 cannot reduce the initial amplitude of vibration of the main surfaces 3*a*. As a result of selling the ratio D/T to be 0.025 or more, the film 4 covering the mam surfaces 3*a* has a sufficient thickness, and thus it is possible to attenuate vibration in the non magnetic substrate 1 early and suppress the initial amplitude of vibration. The ratio D/T is preferably 0.03 or more and more preferably 0.04 or more. On the other hand, although there is no limitation on the upper limit of the ratio D/T from the viewpoint of the above-described issues, if the ratio D/T is excessively large, power consumed by the hard disk drive apparatus that rotates the magnetic disk may increase due to an increase in the weight of the non-magnetic substrate 1 as well as an increase in the material cost of the film 4, and thus the ratio D/T is preferably set to 0.15 or less, for example.

Although the film 4 can exhibit the above-described effects even if the film 4 is provided only on the main surfaces 3*a* and is not provided on the side wall surface 3*b* and the chamfered surfaces 3*c*, as shown in FIG. 2, it is preferable that the film 4 is provided on the edge surfaces of the substrate main body 3, that is, the side wall surface 3*b* and the chamfered surfaces 3*c*, in addition to the main surfaces 3*a*. In this case, the film 4 provided on the side wall surface 3*b* and the chamfered surfaces 3*c* is preferably thicker than the thicknesses D1 and D2 of the films 4 respectively provided on the main surfaces 3a. Vibration occurring in the non magnetic substrate 1 is vibration that shifts in the normal direction of the main surfaces 3a, and shifts in the normal direction of the main surfaces 3a at the edge surfaces of the substrate main body 3 together with shifting of this vibration in the normal direction of the main surfaces 3a. As a result of suppressing such shifting, it is possible to suppress the amount of shift in the normal direction of the main surfaces 3a, that is, the amplitude of vibration, and thus it is preferable that the film 4 is also formed on the edge surfaces of the substrate main body 3, that is, the side wall surface 3b and the chamfered surfaces 3c, in addition to the main surfaces 3a. Specifically, it is preferable that the film 4 provided on the side wall surface 3b and the chamfered surfaces 3c is thicker than the thicknesses D1 and D2 of the films 4 respectively provided on the main surfaces 3a because the amplitude of vibration on the main surfaces 3a can be suppressed. In this case, the thicknesses D1 and D2 of the films 4 provided on the main surfaces 3a are preferably 80% or more, more preferably 85% or more, and even more preferably 90% or more of the thickness of the film 4 provided on the side wall surface 3b and the chamfered surfaces 3e (edge surfaces) in that the amplitude of vibration can be efficiently suppressed. It is preferable that the thicknesses D1 and D2 are closer to the thickness of the film 4 provided on the side wall surface 3b and the chamfered surfaces 3c (edge surfaces). The larger the above-described ratio is and the more even the thickness of the film 4 is on all of the surfaces of the non magnetic substrate 1, the less likely a vibration mode in which local deformation is to occur, and the more easily vibration can be suppressed.

Because the amplitude of vibration increases as the thickness of the magnetic disk is reduced, the number of instances of contact between the magnetic disk and another member in the hard disk drive apparatus increases, and problems arise in that particles formed along with contact therebetween and the number of defects such as scratches and recesses of the magnetic disk increases, but the above-described problems are unlikely to arise even if the non-magnetic substrate 1 has a thickness of 0.640 mm or less. The non magnetic substrate 1 may have a thickness of 0.570 mm or less, 0.52 mm or less, or 0.400 mm or less. Also, the non magnetic substrate 1 may have a thickness of 0.635 mm 0.550 mm, 0.500 mm, or 0.380 mm, for example. From the viewpoint of mechanical durability, the lower limit of the thickness of the non magnetic substrate 1 is preferably 0.2 mm or more. Although, as the thickness of the non magnetic substrate 1 is reduced, formation of particles and occurrence of defects such as scratches and recesses in some cases become more of an issue in principle, this embodiment exhibits significant effects of reducing particles and defects such as scratches and recesses.

According to one embodiment, the film A preferably has a Vickers hardness Hv of 100 [kgf/mm$^2$] or more. As a result of increasing the Vickers hardness Hv, defects such as scratches and recesses are less likely to occur when the magnetic disk comes into contact with a ramp in the hard disk drive apparatus. If the Vickers hardness Hv is less than 100 [kgf/mm$^2$], when the magnetic disk comes into contact with a ramp in the hard disk drive apparatus, defects such as scratches and recesses occur, and the hard disk drive apparatus is likely to fail.

According to one embodiment, it is preferable that the outer circumferential edge surface of the disk-shaped substrate main body 3 that forms an interface with the film A has a surface roughness maximum height Rz (JIS B 0601: 2001) of 0.5 µm or more. The substrate main body 3 is provided with the film 4 on the outer circumferential edge surface thereof as well, but an image of the cross section of the outer circumferential edge surface of the substrate main body 3 can be acquired, and the maximum height Rz can be obtained. Specifically, first, a sample with the outer circumferential edge surface exposed is produced by, using an ion polishing method, cutting the outer circumferential edge surface of the non magnetic substrate 1 provided with the film A along a plane that passes through the center of the non magnetic substrate 1 and is perpendicular to the main surfaces. With regard to this cross-section, an image of the cross-section of the outer circumferential edge surface is obtained using a scanning electron microscope (SEM) at a magnification of 5000, for example. A curve of protrusions and recesses of a surface of the substrate main body 3 that forms the interface where the substrate main body 3 is in contact with the film 4 is acquired from this image through binarization or visual tracing on the image of the cross-section, for example, and a region having a width 20 µm located at any portion on this curve of protrusions and recesses is extracted to obtain the maximum height Rz.

Vibration is further suppressed by the film 4 due to the interface of the substrate main body 3 that is in contact with the film 4 having surface unevenness to some extent. It is inferred that vibration is suppressed because protruding portions of the substrate main body 3 and the film 4 enter and engage recessed port ions of each other at the interface lie tween the substrate main body 3 and the film 4, thus increasing adherence therebetween, and the vibration suppression effect of the film 1 affects the substrate main body 3. Although film stress, which is a factor for causing film separation, increases as a result of making the film 4 thicker, by setting the above described maximum height Rz to be 0.5 µm or more, it is also possible to prevent film separation caused by film stress. The outer circumferential edge surface has a smaller area than the main surface and has a complicated shape, and thus film separation is likely to occur.

Note that, in order to further suppress the above-described vibration, the surface roughness maximum height Rz of the outer circumferential edge surface of the substrate main body 3 is more preferably 1.0 µm or more, and even more preferably 1.5 µm or more. On the other hand, if the maximum height Rz is excessively large, the surface roughness of the film 1 after the film 4 is formed (the surface roughness on the outer circumferential edge surface of the non magnetic substrate 1) increases according to surface roughness of the substrate main body 3, foreign matter is likely to attach to the outer circumferential edge surface during processing such as main surface polishing, and foreign matter also is likely to attach to the outer circumferential edge surface of the magnetic disk after a magnetic film is formed, and thus there is a risk that the yields of the non magnetic substrates 1 and the hard disk drive apparatuses at the time of manufacture will decrease. Note that a portion of the outer circumferential edge surface whose maximum height Rz is set to 0.5 µm or more need only be at least a portion of the outer circumferential edge surface, and in order to enhance suppression of the above-described vibration and prevention of film separation, both the side wall surface 3b and the chamfered surfaces 3c preferably have a maximum height Rz of 0.5 µm or more.

On the other hand, if the maximum height Rz of the main surface of the substrate main body 3 is too large, there is a risk that defects will form at an early stage of the formation of the film 4 and propagate, and defects such as a recessed portion and a crack will occur on a surface of the film A.

Although these defects will cause corrosion and thus should be removed, it is difficult to remove these defects because defects run deep, and thus have lasting effects after a magnetic film is formed to produce a magnetic disk. Thus, it is preferable that the main surface of the substrate main body 3 has a maximum height Rz of 1 μm or less, for example.

Also, according to one embodiment, the surface roughness maximum height Rz of the film A provided on the outer circumferential edge surface of the non magnetic substrate 1 is preferably smaller than the surface roughness maximum height Rz of the substrate main body 3 at the outer circumferential edge surface of the substrate main body 3 (on an interface surface that is in contact with the film 4).

With regard to the surface roughness maximum height Rz of the film 1 on the outer circumferential edge surface of the non magnetic substrate 1, for example, the maximum height Rz is obtained at a plurality of positions (e.g., three positions) on the outer circumferential edge surface using a stylus surface roughness/contour shape measurement device under the following conditions, and an average value thereof obtained at the plurality of positions is used as the surface roughness maximum height Rz of the film 4. Note that the direction in which the stylus moves (scans) is the thickness direction of the non-magnetic substrate 1.

Shape of stylus: the radius of the leading end is 2 μm, and a taper angle of the tone is 60 degrees
Stylus load: 0.75 mN
Stylus moving speed: 0.02 mm/sec
Sampling length: 0.08 mm
Filter λc: 0.08 mm
Filter λs: 0.0008 mm.

If the film 4 provided on the outer circumferential edge surface of the non magnetic substrate 1 has an excessive large surface roughness maximum height Rz, foreign matter is likely to attach to the non-magnetic substrate 1 as a result of the film 4, and thus the above-described maximum height Rz is preferably small. The maximum height Rz is more preferably 1.0 μm or less, and even more preferably 0.5 μm or less. Note that, although a position on the outer circumferential edge surface of the non magnetic substrate 1 at which the maximum height Rz is limited need only be located in at least a portion of the outer circumferential edge surface of the non magnetic substrate 1, in order to enhance the above-described vibration suppression effect and film separation prevention effect, this position is preferably located in a corresponding portion on a surface of the non magnetic substrate 1 corresponding to the side wall surface 3b and the chamfered surfaces 3c. Note that the surface roughness of the film 4 on the outer circumferential edge surface is likely to follow surface roughness of the substrate main body 3, which is the underlayer. Thus, if a surface of the substrate main body 3 is too rough, additional processing such as edge surface polishing processing may be required after the film 4 is formed.

Such a non magnetic substrate 1 is produced as follows, for example. Here, a case where a glass substrate is used as the non-magnetic substrate 1 will be described as one example.

First processing for molding a glass blank that serves as a raw material of a plate-shaped magnet k-disk glass substrate having a pair of main surfaces is performed. Next, the glass blank is roughly ground. Then, shape processing and edge surface polishing am performed on the glass blank. Then, precision grinding is performed on a glass substrate obtained from the glass blank, using fixed abrasive particles. Then, first polishing, chemical strengthening, and second polishing are performed on the glass substrate. Then, film formation and film polishing are performed. Note that, although the glass substrate is produced in the above-described flow in this embodiment, it is not necessary to always perform the above-described processes and these processes may be omit ted as appropriate. For example, in the above-described processes, edge surface polishing, precision grinding, first polishing, chemical strengthening, and second polishing need not be carried out. Hereinafter, each of the processes will be described.

(a) Molding of Glass Blank

A press molding method may be used to mold the glass blank, for example. A circular glass blank can be obtained using a press molding method. Also, a glass blank can be manufactured using a known manufacturing method such as a downdraw method, a redraw method, or a fusion method. A disk-shaped glass substrate, which is the base of a magnetic-disk glass substrate, can be obtained by appropriately performing shape processing on the plate-shaped glass blank produced using these known manufacturing methods.

(b) Rough Grinding

In rough grinding, main surfaces on both sides of the glass blank are ground. Loose abrasive particles are used as an abrasive material, for example. In rough grinding, grinding is performed such that the glass blank is brought approximately closer to a target substrate thickness and a target flatness of the main surfaces. Note that rough grinding is performed according to the dimensional accuracy or the surface roughness of the molded glass blank, and may be omitted in some cases.

(c) Shape Processing

Next, shape processing is performed. In the shape processing, after the glass blank is molded, a circular hole is formed using a known processing method to obtain a disk-shaped glass substrate having a circular hole. Then, chamfering of edge surfaces of the glass substrate, and adjusting of the outer diameter and the inner diameter are carried out through grinding processing. Accordingly, a side wall surface 3b orthogonal to the main surfaces and chamfered surfaces 3c that are inclined with respect to the main surfaces 3a and between the side wall surface 3b and the main surfaces 3a on both sides are formed on the edge surfaces of the glass substrate.

(d) Edge Surface Polishing

Next, edge surface polishing is performed on the glass substrate. Edge surface polishing is processing for performing polishing by supplying a polishing liquid containing loose abrasive particles between a polishing brush and the edge surfaces (the side wall surface 3b and the chamfered surfaces 3c) of the glass substrate and moving the polishing brush and the glass substrate relative to each other. In edge surface polishing, an inner circumferential side edge surface and an outer circumferential side edge surface of the glass substrate are polishing targets, and the inner circumferential side edge surface and the outer circumferential side edge surface are formed into mirror surfaces. Note that edge surface polishing need not be performed in some cases.

(e) Precision Grinding

Next, precision grinding is performed on the main surfaces of the glass substrate. For example, the main surfaces 3a of the glass substrate are ground using a double-side grinding apparatus provided with a planetary gear mechanism. In this case, grinding is performed with the surface plates provided with fixed abrasive particles, for example. Alternatively, grinding is also performed using loose abrasive particles. Note that precision grinding need not be performed in some cases.

(f) First Polishing

Next, first polishing is performed on the main surfaces 3a of the glass substrate. First, polishing is performed using loose abrasive particles and polishing pads attached to the surface plates. First polishing removes cracks and warping remaining on the main surfaces 3a in the case where grinding is performed with fixed abrasive particles, for example. In first polishing, surface roughness of the main surfaces 3a, or for example, an arithmetic average roughness Ra, can be reduced while preventing the shape of the edge portions of the main surfaces 3a from being excessively recessed or protruding.

Although there is no particular limitation on the loose abrasive particles used in first polishing, cerium oxide abrasive particles, zirconia abrasive particles, or the like are used, for example. Note that first polishing need not be performed in some cases.

(g) Chemical Strengthening

The glass substrate can be chemically strengthened as appropriate. A melt obtained by heating potassium nitrate, sodium nitrate, or a mixture thereof, for example, is used as a chemical strengthening liquid. Also, by immersing the glass substrate in the chemical strengthening liquid, lithium ions and sodium ions in the glass composition that are present in a surface layer of the glass substrate are respectively substituted with sodium ions and potassium ions in the chemical strengthening liquid whose ion radii are relatively large, whereby compressive stress layers are formed on the surface layer portions and the glass substrate is strengthened.

Although the timing at which chemical strengthening is performed is determined as appropriate, the polishing is particularly preferably performed after chemical strengthening, because the surface can be smoothed and foreign matter attached to the surface of the glass substrate can be removed through chemical strengthening. Also, chemical strengthening need not be performed in wane cases.

(h) Second Polishing (Mirror-Polishing)

Next, second polishing is performed on the chemically strengthened glass substrate. Second polishing is for performing mirror-polishing on the main surfaces 3a. In second polishing as well, polishing is performed using a polishing apparatus having a configuration similar to that in first polishing. In second polishing, the type and the particle size of loose abrasive particles are changed relative to first polishing and mirror polishing is performed using resin polishers having a low hardness as the polishing pads. Doing so makes it possible to reduce the roughness of the main surfaces 3a while preventing the shape of edge portions of the main surfaces 3a from being excessively recessed or protruding. The main surfaces 3a preferably have an arithmetic average Ra (JIS B 0601 2001) of 0.2 nm or less. Note that second polishing need not be performed in some cases because the main surfaces 3a of the substrate that have been subjected to second polishing are not the outermost surface of the non-magnetic substrate 1 having the film 4.

(i) Film Formation

The film 4 is formed on the main surfaces 3a, the side wall surface 3b, and the chamfered surfaces 3c of the produced glass substrate. The film 4 is formed through electrolytic plating, electroless plating, or the like. Pre-treatment for improving the adherence of the film 4 may be performed as needed before the film 4 is formed. The film 1 is formed on the main surfaces 3a, the side wall surface 3b, and the chamfered surfaces 3c, and can have the same thickness on any of the surfaces. In order to reduce internal stress of the formed film 4, annealing (heat treatment) is performed on the film 4 as needed after the film 4 is formed. Note that the film 4 is preferably a non magnetic film so as not to cause noise when a magnetic disk is finally produced.

(j) Film Polishing

After the film 4 is formed, in order to reduce surface roughness of the film 4, the film 4 provided on the main surfaces 3a of the substrate main body 3 are polished. Film polishing aims to realize mirror polishing. The main surfaces that have been subjected to film polishing preferably have an arithmetic average roughness Ra of 0.2 nm or less, the arithmetic average roughness being measured using an atomic force microscope (AFM). In film polishing as well, polishing can be performed using a polishing apparatus having a configuration similar to that in first polishing. In film polishing, the type and the particle size of loose abrasive particles are changed relative to first polishing and polishing is performed using resin polishers having a low hardness as the polishing pads. In film polishing, polishing may be performed a plurality of times as needed. In this case, precise polishing is performed using loose abrasive particles with a smaller size in polishing in the downstream processes. In this manner, the film 4 formed on the main surfaces 3a is polished, and the film 4 formed on the side wall surface 31) and the chamfered surfaces 3c are not polished, and thus the film 4 formed on the side wall surface 3b and the chamfered surfaces 3c can be made thicker than the film 4 on the main surfaces 3a.

As described above, because the film 4 formed on the side wall surface 3b and the chamfered surfaces 3c exhibits the effect of suppressing the amplitude of vibration of the main surfaces 3a of the non magnetic substrate 1, it is preferable to set the thickness of the film 4 to be formed such that the thickness of the film 4 formed on the side wall surface 3b and the chamfered surfaces 3c has a thickness to an extent that the amplitude of vibration of the main surfaces 3a can be suppressed.

After film polishing is performed, the glass substrate provided with the film 4 is cleaned to produce a non-magnetic substrate 1 fora magnetic disk.

Note that, if the substrate main body 3 is an AL alloy substrate, the substrate main body 3 is produced using the following method, for example.

First, an Al alloy substrate, which is to be the substrate main body 3, is subjected to machining to have a shape with a predetermined size through cutting. In order to improve shape accuracy and flatness of the substrate main body 3, hot-press annealing is then performed. Also, the edge surfaces (inner and outer circumferential edge surfaces) of the substrate main body 3 are ground and polished. When edge surfaces are ground, the edge surfaces of the substrate main body 3 are ground by rotating the edge surfaces and a rotation tool, and supplying a grinding liquid from a nozzle while pressing the rotation tool to which abrasive particles are fixed against edge surfaces of the substrate main body 3 that has been cut in a manner similar to that for the glass substrate. Also, if surface roughness of an edge surface is to be reduced, a polisher made of nonwoven fabric is attached to the surface of the rotation tool, and the edge surfaces of the substrate main body 3 are polished while supplying a polishing liquid in which loose abrasive particles are dispersed. Also, the chamfered surfaces of the substrate main body 3 are formed through grinding using a formed grindstone obtained by shaping an end portion of the rotation tool to a chamfering shape in advance. Next, the main surfaces of the substrate main body 3 are ground using a double side grinding apparatus, are polished a plurality of times using a double-side polishing apparatus, polyurethane foam resin polishers, and a polishing liquid containing alumina abrasive particles or colloidal silica abrasive particles, and are lastly cleaned.

Note that zincate treatment may be performed on the substrate main body 3 as pre-treatment of formation of the film 4. After the film 4 is formed, annealing is performed as appropriate in order to reduce the internal stress of the film 4. After the film 4 is annealed, the main surfaces 3a are polished. Polishing is performed a plurality of times as needed for the substrate. Then, cleaning is performed to produce a non-magnetic substrate 1 for a magnetic disk.

In addition to the above described Ni—P alloy, an Mg alloy, an Al—Zn alloy, an Mg—Zr alloy, and the like can be used for the film 4. Here from the viewpoint of suppressing vibration of the nonmagnetic substrate 1, the material of the film 4 has a higher loss factor than the substrate main body 3 and has a loss factor of 0.01 or more, and according to one embodiment, the material of the film 4 preferably has a loss factor of 0.02 or more, and more preferably has a loss factor of 0.03 or more. Also, the substrate main body 3 preferably has a loss factor of 0.002 or less, and more preferably has a loss factor of 0.001 or less. The smaller the loss factor of the substrate main body 3 is, the better the vibration suppression effect of the film 4 is, and thus the substrate main body 3 having a smaller loss factor is preferable. An amorphous aluminosilicate glass substrate to be used for a magnetic disk has a loss factor of 0.001 or less, for example. Also, an Al—Mg alloy substrate for a magnetic disk has a loss factor of 0.002 or less, for example. In this manner, the loss factor of the film 4 is sufficiently large with respect to the loss factor of the substrate main body 3, and thus, as a result of forming the film 4, a vibration suppression effect can be effectively obtained.

Also, according to one embodiment, from the viewpoint that particles, scratches, and recesses are less likely to occur, the material of the film 4 preferably has a Vickers hardness Hv of 100 [kgf/mm$^2$] or more, more preferably has a Vickers hardness Hv of 200 [kgf/mm$^2$] or more, and even more preferably has a Vickers hardness Hv of 400 [kgf/mm$^2$] or more.

Table 1 below shows properties of materials that can be suitably used as the material of the substrate main body 3 and the film 4. Loss factors shown in Table 1 lie low were calculated using the above-described loss factor calculation method. The value of a loss factor is the value at room temperature. A Vickers hardness Hv is measured using a micro-Vickers hardness tester, under conditions in which the indenter load was 10 gf for the film 4 because the film 4 was a thick film and the indenter load was 300 gf for the substrate main body 3.

TABLE 1

|  | Loss Factor | Vickers Hardness [kgf/mm$^2$] |
| --- | --- | --- |
| Aluminosilicate glass | 0.0003~0.0008 | 650 |
| Al—Mg Alloy | 0.0005~0.0017 | 50~100 |
| Mg Alloy | 0.01 | 55 |
| Al—Zn Alloy | 0.05 | 100 |
| Mg—Zr Alloy | 0.09 | 100 |
| Ni—P Alloy | 0.03 | 500 |

In Table 1 above, the loss factor of aluminosilicate glass is obtained from glass having the composition of the above-described glass 1 or glass 2. Note that the glass 2 typically has a loss factor of 0.0006.

The composition of the Al—Mg alloy includes Mg in an amount of 3.5 to 5 mass %, Si in an amount of 0 to 0.05 mass %, Fe in an amount of 0 to 0.1 mass %, Cu in an amount of 0 to 0.12 mass %, Mn in an amount of 0 to 0.3 mass %, Cr in an amount of 0 to 0.1 mass %, Zn in an amount of 0 to 0.5 mass %, Ti in an amount of 0 to 0.1 mass %, and Al as the remaining portion, for example.

The composition of an Mg alloy includes Mg in an amount of 91.57 mass %, Al in an amount of 7.6 mass %, Zn in an amount of 0.7 mass %, and Mn in an amount of 0.13 mass %.

The composition of an Al—Zn alloy includes Al in an amount of 60 mass % and Zn in an amount of 40 mass %.

The composition of an Mg—Zr alloy include Mg in an amount of 99.4 mass % and Zn in an amount of 0.6 mass %.

The composition of an Ni—P alloy includes Ni in an amount of 90 mass % and P in an amount of 10 mass %.

As is understood from Table 1, from the viewpoint of vibration suppression, it is preferable to use aluminosilicate glass or an Al Mg alloy as the material of the substrate main body 3, and use an Ni—P alloy, an Mg alloy, an Al—Zn alloy, and an Mg—Zr alloy as the material of the film 4. Also, an Ni—P alloy, an Al—Zn alloy, and an Mg—Zr alloy have a high Vickers hardness Hv of 100 [kgf/mm$^2$] or more, and are more suitable as the material of the film 4, and particles, scratches, and recesses are less likely to occur. Also, it is understood that an Ni—P alloy has a very high Vickers hardness Hv and is even more suitable as the material of the film 4.

Experimental Example 1

In order to examine the effects of the non magnetic substrate 1, various substrates were produced.

Amorphous aluminosilicate glass and an aluminum alloy (Al—Mg alloy) satisfying the above-described glass composition was used as the material of the substrate main body of the nonmagnetic substrate 1. In a case where the film 4 was formed, the film 4 was formed through electroless plating such that an Ni—P alloy (P: 10 mass %, the remaining portion was Ni) covered all of the surfaces of the substrate main body 3 at an equal film thickness. Then, main surfaces on both sides were polished using a double-side polishing apparatus, and 20% of the thickness of the film 4 formed on each main surface was removed through polishing. The film 4 had the same final thickness on the main surfaces on both sides, and the thickness of the film 4 formed on each main surface was 80% of the thickness of the film 4 formed on an edge surface. The loss factor of the Ni—P alloy satisfied 0.01 or more.

Also, the produced non-magnetic substrate 1 had an outer diameter of 95 mm and an inner diameter (the diameter of a circular hole) of 25 mm, and chamfered surfaces were formed at connection portions of an outer circumferential edge surface and an inner circumferential edge surface that are respectively connected to both main surfaces. With regard to the specification of this chamfered surface, an angle to a main surface was 45 degrees, the length thereof in a radial direction was 150 μm, and the length thereof in the thickness direction was 150 μm. Roughness of the outer circumferential edge surface at this time was adjusted such that the surface of the substrate main body 3 and the surface of the nonmagnetic substrate 1 had a maximum height Rz of 0.1 μm.

A magnetic disk obtained by forming a magnetic film on the produced non magnetic substrate 1 was incorporated in an evaluation apparatus obtained by modifying a hard disk drive apparatus. The evaluation apparatus internally includes a high-speed camera for observing vibration of the magnetic disk, and can apply vibration of any magnitude to the magnetic disk while observing vibration of the magnetic disk using the high-speed camera. Note that the magnetic disk does not rotate in the evaluation apparatus, and evaluation is made in a stationary state. A member imitating a ramp member produced using a PEEK (polyether ether ketone) was incorporated in the evaluation apparatus, and when magnetic disks were mounted, there were 0.2 mm-gaps extending from both main surfaces. That is, a gap between ramps that a magnetic disk enters had a length of the thickness of the magnetic disk+0.4 mm. A plurality of evaluation apparatuses having different specifications were prepared so as to have a fixed gap, even if the thickness of a substrate was changed. Note that, even if the thickness of a magnetic film formed in a media process can be substantially ignored because the thickness of the magnetic film was about 100 nm or less even if it includes a base film and a soft magnetic layer. Five magnetic disks were mounted in the evaluation apparatus, and a portion of main surfaces of all magnetic disks were held by the ramp member.

An impact test for applying a constant impact to the magnetic disks using the evaluation apparatus was performed. The magnitude of the impact was optimized to be a value at which a magnetic disk of a comparative example, which was the standard (100%) of a defect/foreign matter ratio in each of Tables 2 to 5, collided with the ramp several limes. Specifically, in the case of Table 2, the impact was applied under the conditions of 140 G and 2 m seconds. Hereinafter, the impact was 120 G in Table 3, 90 G in Table 4 and 70 G in Table 2 with the application time kept at 2 m seconds. After the impact test was performed, the number of particles and defects such as scratches and recesses on main surfaces of 5 incorporated magnetic disks were counted by visually examining the surfaces 1 hereof under a condensing lamp in a dark room. These particles, scratches, and recesses occurred as a result of the magnetic disks coining into contact with the ramp member and other disks in the apparatus in the impact test. In Tables 2 to 5 below, the number of particles, scratches, and recesses in examples and comparative examples was shown as relative "defect and foreign matter ratios" where the number of particles, scratches, and recesses in Comparative Examples 1, 4, 7, or 10 was the standard (100%). The smaller the defect and foreign matter ratio is, the smaller the number of particles, scratches, and recesses is. It is inferred that, the smaller the defect and foreign matter ratio is, the longer the lifespan of the hard disk drive apparatus substantially is due to the effect of suppressing particles etc.

In the comparative examples anti examples shown in Tables 2 to 5 below, the ratio D/T was changed in various ways by changing the thickness of the film 4 with the thickness of the substrate main body 3 kept constant.

TABLE 2

|  | Conv. Ex. 1 | Comp. Ex. 1 | Comp. Ex. 2 | Comp. Ex. 3 | Ex. 1 | Ex. 2 | Ex. 3 | Ex. 4 |
| --- | --- | --- | --- | --- | --- | --- | --- | --- |
| Material of Substrate Main Body 3 | glass | glass | glass | glass | glass | glass | glass | glass |
| Presence of Film 4 | no | no | yes | yes | yes | yes | yes | yes |
| Thickness of Non-Magnetic Substrate 1 (mm) | 0.750 | 0.640 | 0.640 | 0.640 | 0.640 | 0.640 | 0.640 | 0.640 |
| Ratio D/T | — | — | 0.01 | 0.02 | 0.025 | 0.03 | 0.04 | 0.05 |
| Defect and Foreign Matter Ratio (%) | 0 | 100 (standard) | 95 | 90 | 68 | 43 | 10 | 7 |

TABLE 3

|  | Conv. Ex. 2 | Comp. Ex. 4 | Comp. Ex. 5 | Comp. Ex. 6 | Ex. 5 | Ex. 6 | Ex. 7 | Ex. 8 |
| --- | --- | --- | --- | --- | --- | --- | --- | --- |
| Material of Substrate Main Body 3 | aluminum alloy | aluminum alloy | aluminum alloy | aluminum alloy | aluminum alloy | aluminum alloy | aluminum alloy | aluminum alloy |
| Presence of Film 4 | no | no | yes | yes | yes | yes | yes | yes |
| Thickness of Non-Magnetic Substrate 1 (mm) | 0.750 | 0.640 | 0.640 | 0.640 | 0.640 | 0.640 | 0.640 | 0.640 |
| Ratio D/T | — | — | 0.01 | 0.02 | 0.025 | 0.03 | 0.04 | 0.05 |
| Defect and Foreign Matter Ratio (%) | 0 | 100 (standard) | 98 | 92 | 58 | 31 | 7 | 4 |

TABLE 4

|  | Comp. Ex. 7 | Comp. Ex. 8 | Comp. Ex. 9 | Ex. 9 | Ex. 10 | Ex. 11 | Ex. 12 | Ex. 13 |
|---|---|---|---|---|---|---|---|---|
| Material or Substrate Main Body 3 | glass | glass | glass | glass | glass | glass | glass | glass |
| Presence of Film 4 | no | yes | yes | yes | yes | yes | yes | yes |
| Thickness of Non-Magnetic Substrate 1 (mm) | 0.520 | 0.520 | 0.520 | 0.520 | 0.520 | 0.520 | 0.520 | 0.520 |
| Ratio D/T | — | 0.01 | 0.02 | 0.025 | 0.03 | 0.04 | 0.05 | 0.062 |
| Defect and Foreign Matter Ratio (%) | 100 (standard) | 93 | 88 | 54 | 26 | 8 | 6 | 4 |

TABLE 5

|  | Comp. Ex. 10 | Comp. Ex. 11 | Comp. Ex. 12 | Ex. 14 | Ex. 15 | Ex. 16 | Ex. 17 | Ex. 18 |
|---|---|---|---|---|---|---|---|---|
| Material of Substrate Main Body 3 | aluminum alloy | aluminum alloy | aluminum alloy | aluminum alloy | aluminum alloy | aluminum alloy | aluminum alloy | aluminum alloy |
| Presence of Film 4 | no | yes | yes | yes | yes | yes | yes | yes |
| Thickness of Non-Magnetic Substrate 1 (mm) | 0.520 | 0.520 | 0.520 | 0.520 | 0.520 | 0.520 | 0.520 | 0.520 |
| Ratio D/T | — | 0.01 | 0.02 | 0.025 | 0.03 | 0.04 | 0.05 | 0.062 |
| Defect and Foreign Matter Ratio (%) | 100 (standard) | 97 | 91 | 45 | 16 | 3 | 2 | 2 |

According to Tables 2 and 3, although problems of particles, scratches, and recesses did not occur at all in Conventional Examples 1 and 2 in which the non magnetic substrate 1 was thicker than 0.700 mm, problems of particles, scratches, and recessed occurred in Comparative Examples 1 and 3 in which the non-magnetic substrate 1 was thinner than 0.700 mm. However, through comparisons between Comparative Examples 2 and 3 and Examples 1 to 4, and comparisons between Comparative Examples 5 and G and Examples 5 to 8, it was understood that the number of particles, scratches, and recesses was effectively reduced by setting the ratio D/T to be 0.025 or more.

As shown in Tables 4 and 5, through comparisons between Comparative Examples 8 and 9 and Examples 9 to 13, and comparisons between Comparative Examples 11 and 12 and Examples 14 to 18, it is understood that, even if the thickness of the non magnetic substrate 1 was 0.520 mm, the number of particles, scratches, and recesses was effectively reduced by setting the ratio D/T to be 0.025 or more. Also, it is understood that the effect of reducing the number of particles, scratches, and recesses was better than in a case where the thickness of the non-magnetic substrate 1 was 0.640 mm.

Also, in Tables 2 to 5, in a ease where examples (e.g., Examples 10 and 15) having the same specifications except for the material of the substrate main body 3 are compared to each other, the material of the substrate main body 3 had a smaller defect and foreign matter ratio in a case where an Al alloy was used than in a case where glass was used. Accordingly, it can be said that vibration was further suppressed in a case where an Al alloy substrate was used as the substrate main body 3 than in a case where glass was used as the substrate main body 3. Note that the above-described vibration suppression effect is more effective in a case where there is a high possibility that a magnetic disk will come into contact with a ramp, and thus the non magnetic substrate 1 is particularly preferable in an HDD having a specification in which a gap between ramps that the magnetic disk enter has a length of "the thickness of the magnetic disk+0.4 mm or less".

Experimental Example 2

In order to examine surface roughness of the substrate main body 3 at an interface where the substrate main body 3 is in contact with the film 4 and vibration suppression effect, various substrates were produced.

In the non-magnetic substrate 1 produced in Experimental Example 2, the specifications of the substrate main body 3 and the film 4 were the same as those in Experimental Example 1, except that surface roughness of the outer circumferential edge surface of the substrate main body 3 was adjusted by changing conditions of edge surface grinding and edge surface polishing as appropriate. A magnetic disk obtained by forming a magnetic film on the non-magnetic substrate 1 was incorporated in the same evaluation apparatus as that of Experimental Example 1, and the vibration suppression effect was evaluated by performing the same impact test as that of Experimental Example 1 and obtaining defect and foreign matter ratios.

Examples 1, 5, and 14 shown in Tables 6 to 8 below were the same as Examples 1, 5, and 14 shown in Tables 2, 3, and 5. In those examples, the surface roughness maximum height Rz of the substrate main body 3 at the interface where the substrate main body 3 is in contact with the film 4 was 0.1 μm.

The maximum height Rz of an outer circumferential edge surface was adjusted based on Examples 1, 5, and 14 without changing the type of substrate main body 3, whether or not the film 4 was present, the thickness of the non-magnetic substrate 1, and the ratio DAT. The maximum height Rz was changed by changing the count of a grinding grindstone and the period of time for polishing the outer circumferential edge surface in outer circumferential edge surface shape processing at the time of production of the substrate main body 3. Thus, examples in which surface roughness of outer circumferential edge surfaces was adjusted based on Example 1 were Examples 1A, 1B, and 1C in Table 6 below and examples in which surface roughness was adjusted based on Examples 5 and 14 were Examples 5A, 5B, and 5C and Examples 14A, 14B, and 14C in Tables 7 and 8 in a similar manner.

TABLE 6

|  | Ex. 1 | Ex. 1A | Ex. 1B | Ex. 1C |
|---|---|---|---|---|
| Max. Height Rz of Side Wall Surface of Substrate Main Body 3 at interface where Substrate Main body 3 is in Contact with Film 4 (μm) | 0.1 | 0.5 | 1.0 | 1.5 |
| Defect and Foreign Matter Ratio (%) | 68 | 63 | 61 | 59 |

TABLE 7

|  | Ex. 5 | Ex. 5A | Ex. 5B | Ex. 5C |
|---|---|---|---|---|
| Max. Height Rz of Side Wall Surface of Substrate Main Body 3 at interface where Substrate Main body 3 is in Contact with Film 4 (μm) | 0.1 | 0.5 | 1.0 | 1.5 |
| Defect and Foreign Matter Ratio (%) | 58 | 53 | 51 | 49 |

TABLE 8

|  | Ex. 14 | Ex. 14A | Ex. 14B | Ex. 14C |
|---|---|---|---|---|
| Max. Height Rz of Side Wall Surface of Substrate Main Body 3 at interface where Substrate Main body 3 is in Contact with Film 4 (μm) | 0.1 | 0.5 | 1.0 | 1.5 |
| Defect and Foreign Matter Ratio (%) | 45 | 40 | 38 | 36 |

It is understood that, in any of the cases shown in Tables 6 to 8, the number of particles, scratches, and recesses was effectively reduced by setting the maximum height Rz of the substrate main body 3 at the interface where the substrate main body 3 is in contact with the film 4 to be 0.5 μm or more, and those examples had a strong vibration suppression effect. Also, it is understood that a much better vibration suppression effect can be obtained by setting the maximum height Rz to be 1.0 μm or more, or to be 1.5 μm or more.

From the above-described results of evaluation, the effects of the non-magnetic substrate 1 for a magnetic disk are clear.

As described above, although a non magnetic substrate for a magnetic disk and a magnetic disk according to the present invention have been described in detail, the present invention is not limited to the above-described embodiment and examples etc., and it will be appreciated that various improvements and modifications can be made without departing from the gist of the present invention.

One aspect of this disclosure is a non magnetic substrate for a magnetic disk. The non magnetic substrate includes
a substrate main body having two opposing main surfaces, and
a metal film that is provided on the main surfaces and is made of a material having a loss factor of 0.01 or more.

The non magnetic substrate has a thickness (T+D) of 0.700 mm or less, the thickness (T+D) being the sum of a thickness T of the substrate main body and a thickness D of the metal film.

A ratio D/T of the thickness D of the metal film to the thickness T of the substrate main body is 0.025 or more.

The metal film is provided on each of the main surfaces, and is provided on an edge surface of the substrate main body.

It is preferable that the thickness of the metal film provided on each of the main surfaces is 80% or more of the thickness of the metal film provided on the edge surface.

It is preferable that the nonmagnetic substrate has a thickness of 0.640 mm or less.

It is preferable that the non-magnetic substrate for a magnetic disk has a disk shape, and
the disk shape has an outer diameter of 90 mm or more.

It is preferable that the metal film has a Vickers hardness Hv of 100 [kgf/mm$^2$] or more.

It is preferable that the metal film is formed on the main surfaces and an outer circumferential edge surface of the substrate main body, and
the outer circumferential edge surface of the substrate main body forming an interface with the metal film has a surface roughness maximum height Rz of 0.5 μm or more.

It is preferable that the metal film is formed on the main surfaces and an outer circumferential edge surface of the substrate main body, and
a surface roughness maximum height Rz of the film formed on the outer circumferential edge surface of the non magnetic substrate for a magnetic disk is smaller than a surface roughness maximum height Rz of the substrate main body at the outer circumferential edge surface of the substrate main body.

Another aspect of this disclosure is a magnetic disk, in which a surface of the non magnetic substrate for a magnetic disk has at least a magnetic film.

According to the above-described non-magnetic substrate for a magnetic disk and magnetic disk, it is possible to effectively reduce vibration of the magnetic disk caused by an external impact that is different from flutter vibration even if the thickness of a magnetic-disk substrate is reduced.

What is claimed is:

1. A substrate for a magnetic disk, the substrate comprising:
a substrate main body having two opposing main surfaces and an outer circumferential edge surface, the outer circumferential edge surface including a side wall surface, which is orthogonal to the main surfaces, and chamfered surfaces, which are disposed between the main surfaces and the side wall surface, the substrate main body being a glass substrate main body or an aluminum alloy substrate main body, the substrate main body having a disk shape; and
a film that is an alloy film containing Ni and P, and is provided on a surface of the substrate main body such that the film is formed continuously over the main surfaces, the chamfered surfaces, and the side wall surface of the substrate main body,
wherein the substrate has a thickness (T+D) of 0.520 mm or less, the thickness (T+D) being the sum of a thickness T of the substrate main body and a thickness D of the film formed on the main surfaces of the substrate main body,
the disk shape has an outer diameter of 90 mm or more,
a ratio D/T of the thickness D of the film to the thickness T of the substrate main body is 0.025 or more, and the thickness of the film formed on the outer circumferential edge surface of the substrate main body is greater than the thickness of the film formed on each of the main surfaces of the substrate main body, and the thickness of the film formed on each of the main surfaces of the substrate main body is 80% or more of the thickness of the film formed on the outer circumferential edge surface of the substrate main body.

2. The substrate for a magnetic disk according to claim 1, wherein
the thickness of the film formed on each of the main surfaces of the substrate main body is 85% or more of the thickness of the film formed on the outer circumferential edge surface of the substrate main body.

3. The substrate for a magnetic disk according to claim 1, wherein
the thickness of the film formed on each of the main surfaces of the substrate main body is 90% or more of the thickness of the film formed on the outer circumferential edge surface of the substrate main body.

4. The substrate for a magnetic disk according to claim 3, wherein
a surface roughness maximum height Rz of the film formed on the outer circumferential edge surface of the substrate main body is smaller than a surface roughness maximum height Rz of the substrate main body at the outer circumferential edge surface of the substrate main body.

5. The substrate for a magnetic disk according to claim 4, wherein
the outer circumferential edge surface of the substrate main body forming an interface with the film formed on the outer circumferential edge surface of the substrate main body has the surface roughness maximum height Rz of 0.5 μm or more.

6. The substrate for a magnetic disk according to claim 3, wherein
the outer circumferential edge surface of the substrate main body forming an interface with the film formed on the outer circumferential edge surface of the substrate main body has a surface roughness maximum height Rz of 0.5 μm or more.

7. The substrate for a magnetic disk according to claim 1, wherein
the ratio D/T is 0.03 or more.

8. The substrate for a magnetic disk according to claim 1, wherein
a surface roughness maximum height Rz of the film formed on the outer circumferential edge surface of the substrate main body is smaller than a surface roughness maximum height Rz of the substrate main body at the outer circumferential edge surface of the substrate main body.

9. The substrate for a magnetic disk according to claim 8, wherein
the outer circumferential edge surface of the substrate main body forming an interface with the film formed on the outer circumferential edge surface of the substrate main body has the surface roughness maximum height Rz of 0.5 μm or more.

10. The substrate for a magnetic disk according to claim 1, wherein
the outer circumferential edge surface of the substrate main body forming an interface with the film formed on the outer circumferential edge surface of the substrate main body has a surface roughness maximum height Rz of 0.5 μm or more.

11. A magnetic disk, wherein
a surface of the substrate for a magnetic disk according to claim 1 has at least a magnetic film.

12. A magnetic disk, wherein
a surface of the substrate for a magnetic disk according to claim 2 has at least a magnetic film.

13. A magnetic disk, wherein
a surface of the substrate for a magnetic disk according to claim 3 has at least a magnetic film.

14. A magnetic disk, wherein
a surface of the substrate for a magnetic disk according to claim 4 has at least a magnetic film.

15. A magnetic disk, wherein
a surface of the substrate for a magnetic disk according to claim 5 has at least a magnetic film.

16. A magnetic disk, wherein
a surface of the substrate for a magnetic disk according to claim 6 has at least a magnetic film.

17. A magnetic disk, wherein
a surface of the substrate for a magnetic disk according to claim 7 has at least a magnetic film.

18. A magnetic disk, wherein
a surface of the substrate for a magnetic disk according to claim 8 has at least a magnetic film.

19. A magnetic disk, wherein
a surface of the substrate for a magnetic disk according to claim 9 has at least a magnetic film.

20. A magnetic disk, wherein
a surface of the substrate for a magnetic disk according to claim 10 has at least a magnetic film.

* * * * *